United States Patent
Gao et al.

(10) Patent No.: US 9,939,838 B1
(45) Date of Patent: Apr. 10, 2018

(54) SYSTEMS AND METHODS FOR TIME STAMPING SENSOR DATA

(71) Applicant: Invensense Incorporated, San Jose, CA (US)

(72) Inventors: Ge Gao, Fremont, CA (US); William Kerry Keal, Santa Clara, CA (US); Rosa M. Y. Chow, Redwood City, CA (US)

(73) Assignee: InvenSense, Inc., San Jose, CA (US)

( * ) Notice: Subject to any disclaimer, the term of this patent is extended or adjusted under 35 U.S.C. 154(b) by 273 days.

(21) Appl. No.: 14/602,531

(22) Filed: Jan. 22, 2015

(51) Int. Cl.
G06F 1/14 (2006.01)
G06F 1/04 (2006.01)

(52) U.S. Cl.
CPC ..................... *G06F 1/04* (2013.01)

(58) Field of Classification Search
CPC ..................... G06F 1/04; G06F 1/10
See application file for complete search history.

(56) References Cited

U.S. PATENT DOCUMENTS

| | | | | |
|---|---|---|---|---|
| 7,254,504 B2* | 8/2007 | Klotz | ..................... | G01S 13/931 702/85 |
| 8,081,868 B2* | 12/2011 | Choi | ..................... | H04N 5/76 386/262 |
| 9,104,189 B2* | 8/2015 | Berges Gonzalez | ... | G01D 4/004 |
| 9,179,885 B2* | 11/2015 | Georgi | ..................... | A61B 6/037 |
| 2001/0008577 A1* | 7/2001 | Yamada | ..................... | G11B 27/005 386/201 |
| 2003/0171898 A1* | 9/2003 | Tarassenko | ..................... | A61B 5/02055 702/189 |
| 2007/0067119 A1* | 3/2007 | Loewen | ..................... | G01R 22/065 702/57 |
| 2008/0307075 A1* | 12/2008 | Urano | ..................... | G04G 5/002 709/220 |
| 2009/0245124 A1* | 10/2009 | Ichikawa | ..................... | H04L 43/106 370/252 |
| 2012/0290230 A1* | 11/2012 | Berges Gonzalez | ... | G01D 4/004 702/61 |
| 2013/0094372 A1* | 4/2013 | Boot | ..................... | H04L 43/028 370/252 |
| 2013/0311797 A1* | 11/2013 | Ahmad | ..................... | G06F 1/3209 713/310 |
| 2015/0067381 A1* | 3/2015 | Nichols | ..................... | H04J 3/0697 713/400 |
| 2016/0014486 A1* | 1/2016 | Macours | ..................... | H04R 1/02 381/111 |

\* cited by examiner

*Primary Examiner* — Mohammed Rehman
(74) *Attorney, Agent, or Firm* — Bay Area Technology Law Group PC

(57) ABSTRACT

Systems and methods are disclosed for providing sensor data to a host processor. A sequence of data samples may be generated at a sample rate established by a clock source associated with the sensor. A time stamp derived from another clock source, such as the clock employed by the host processor, is assigned to at least one of each periodically retrieved data samples. As such, at least one of the assigned time stamps then may be adjusted by applying a correction determined from a timing characteristic associated with retrieval of the data samples.

35 Claims, 4 Drawing Sheets

SYSTEMS AND METHODS FOR TIME STAMPING SENSOR DATA

FIELD OF THE PRESENT DISCLOSURE

This disclosure generally relates to processing data supplied by a sensor and more specifically to correcting time stamps associated with such data.

BACKGROUND

Technology developments have enabled the implementation of a wide variety of sensors into a correspondingly wide variety of devices. In general, sensors detect or measure physical or environmental properties. Depending on the condition being measured, some sensors, such as thermometers, are able to deliver desired information at an instantaneous moment without accounting for time. In other applications, however, the sensor may output data that is further processed with timing parameters in order to obtain the desired information. For example, the quantity measured by the sensor may represent a derivative of another quantity. In the case of a gyroscope, the sensor outputs a measured angular velocity. Thus, to determine an orientation of a device equipped with a gyroscope, measured angular velocities may be integrated over time to determine the angular orientation. Similarly, the data output by an accelerometer may be singly integrated to derive a linear velocity for the device and doubly integrated to determine distance traveled. Other sensor applications may also rely on integration or other operations that utilize timing parameters to derive the desired information.

Therefore, the quality of the information determined in sensor applications that involve processing the obtained data with timing parameters may be improved by having accurate timing information for the samples being output by the sensor. In one aspect, this may involve associating time stamps with a plurality of sensor data samples. Depending on the architecture of the sensor, there may be a clock associated with the sensor that is used for coordinating operations of the sensor and/or establishing a sampling rate. Using a highly accurate clock in such applications may not be practically feasible due to the costs involved or the chosen architecture. As such, some sensor designs employ clocks based on resistance-capacitance (RC) designs or other similar circuits that are relatively inexpensive but may not offer the accuracy associated with more sophisticated techniques, such as crystal controlled oscillators. Therefore, integration operations relying on time stamps derived from the sensor clock may suffer from a correspondingly reduced accuracy.

In some applications, the sensor may output data to a host processor. Often, the host processor employs a clock source that is more accurate than the sensor clock. Thus, utilizing the host processor clock to determine time stamps for data samples obtained from the sensor may result in improved performance. However, such techniques have limitations. Typically, the sensor outputs a sequence of data samples at the frequency established by the sampling rate of the sensor. One or more of the samples are then stored in a buffer or other memory structure to be retrieved by the host processor. The host processor clock (or another system clock) is used to determine time stamps for the samples when they are retrieved from the buffer, typically after receiving an interrupt from the sensor that signals availability of data. Since the host processor may be performing other operations or may be in a power save mode, a variable delay is introduced between the time when each sample becomes available for retrieval and the time when each sample is actually retrieved. Therefore, even though a more accurate clock may be employed to provide the time stamp information, timing errors may still exist, undermining the precision of the integration operations.

Accordingly, there remains a need for techniques to time stamp samples of sensor data in a manner that provides more accurate determinations. In one aspect, this may include adjusting one or more time stamps to correct a time interval between samples. As will be described in the material that follows, the techniques of this disclosure satisfy this and other needs.

SUMMARY

As will be described in detail below, this disclosure includes a method for providing sensor data to a host processor. The method may involve generating a sequence of data samples with a sensor at a sample rate established by a first clock source associated with the sensor, storing each of the data samples, periodically retrieving at least one data sample and any available additional data samples using the host processor, assigning a time stamp derived from a second clock source to each of the at least one periodically retrieved data samples using the host processor, wherein the second clock source is independent of the first clock source, and adjusting at least one assigned time stamp by applying a correction determined from a timing characteristic associated with retrieval of data samples from the sensor to provide a corrected time stamp.

The disclosure also includes a sensor device having a sensor that generates a sequence of data samples, a first clock source associated with the sensor, wherein the sequence of data samples are generated at a sample rate established by the first clock source, a memory to store data samples as they are generated, a host processor configured to periodically retrieve at least one data sample and any available additional data samples from the memory, a second clock source independent of the first clock source, wherein the host processor is further configured to assign a time stamp derived from the second clock source to each of the at least one periodically retrieved data samples and a time stamp controller configured to determine a timing characteristic associated with retrieval of data samples from the sensor and adjust at least one assigned time stamp by applying a correction determined from the timing characteristic.

DETAILED DESCRIPTION

Figure 1:
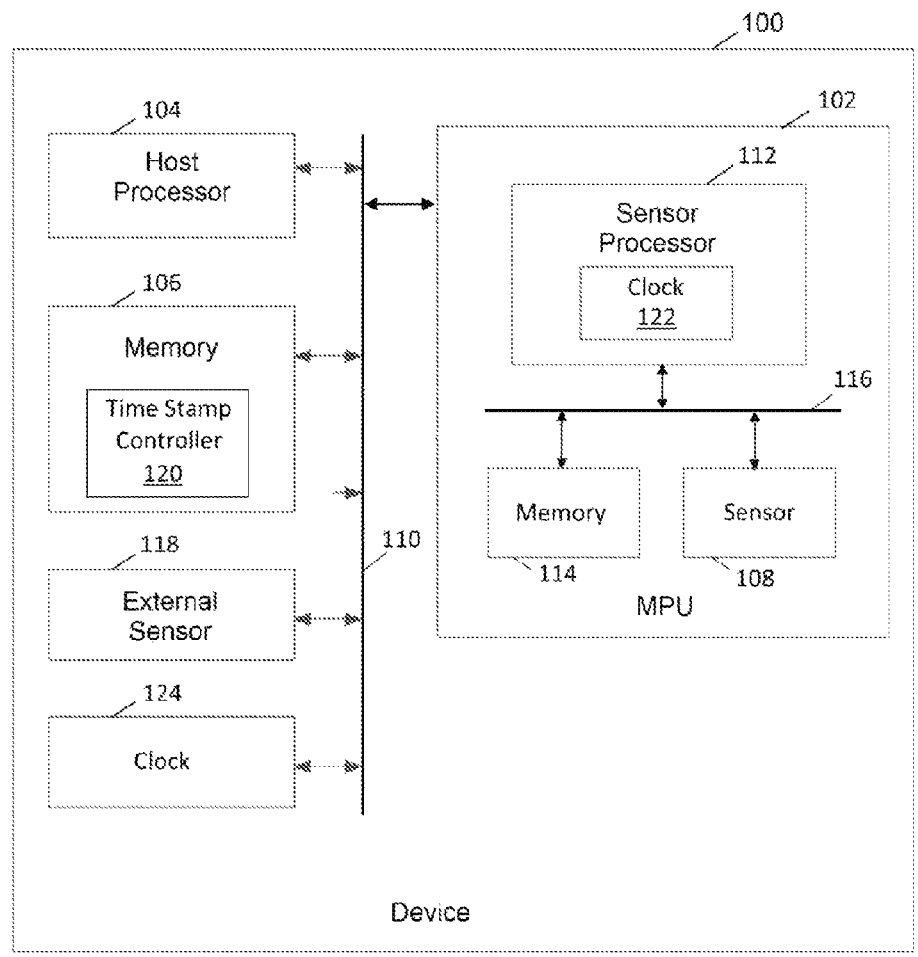
FIG. 1 is a schematic diagram of a device configured to provide sensor data to a host processor by time stamping a sequence data samples according to an embodiment.

At the outset, it is to be understood that this disclosure is not limited to particularly exemplified materials, architectures, routines, methods or structures as such may vary.

Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more microcontroller units (MCUs), motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

In one aspect, one or more sensors may be implemented using Micro Electro Mechanical System (MEMS) technology. In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. In some configurations, a substrate portion known as a MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a motion tracking module also referred to as Motion Processing Unit (MPU) that includes at least one sensor in addition to electronic circuits. The sensor may be a gyroscope, a magnetometer, an accelerometer, a microphone, a pressure sensor, a proximity sensor, or an ambient light sensor, or others known in the art. Some embodiments include accelerometer, gyroscope, and magnetometer, which each provide a measurement along three axes that are orthogonal to each other. Such a device is often referred to as a 9-axis device. Other embodiments may not include all the sensors or may provide measurements along one or more axes. The sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification. In the described embodiments, a MPU may include processors, memory, control logic and sensors among structures. Further, although embodiments herein may be described in the context of MEMS sensors, the techniques of this disclosure may be applied to any sensor technology as desired.

As indicated above, the techniques of this disclosure may include providing sensor data to a host processor by generating a sequence of data samples. The data samples may be generated by the sensor at a sample rate established by a clock source associated with the sensor. One or more of the data samples may be stored at a time for subsequent periodic retrieval by the host processor. A time stamp derived from another clock source, such as the clock employed by the host processor, is assigned to at least one of each sample retrieved at a given time. As such, at least one of the assigned time stamps then may be adjusted by applying a correction determined from a timing characteristic associated with retrieval of the data samples.

To help illustrate aspects of this disclosure, details regarding one embodiment of a mobile electronic device 100 including features of this disclosure are depicted as high level schematic blocks in FIG. 1. As will be appreciated, device 100 may be implemented as a device or apparatus, such as a handheld device that can be moved in space by a user and its motion and/or orientation in space therefore sensed. For example, such a handheld device may be a mobile phone (e.g., cellular phone, a phone running on a local network, or any other telephone handset), wired telephone (e.g., a phone attached by a wire), personal digital assistant (PDA), video game player, video game controller, navigation device, activity or fitness tracker device (e.g., bracelet or clip), smart watch, other wearable device, mobile internet device (MID), personal navigation device (PND), digital still camera, digital video camera, binoculars, telephoto lens, portable music, video, or media player, remote control, or other handheld device, or a combination of one or more of these devices.

Device 100 may be a self-contained device or may function in conjunction with another portable device or a non-portable device such as a desktop computer, electronic tabletop device, server computer, etc. which can communicate with the device 100, e.g., via network connections. The device may be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

As shown, device 100 includes motion processing unit (MPU) 102, host processor 104 and host memory 106. MPU 102 has internal sensor 108, which may represent one or more sensors, such as accelerometers, gyroscopes, magnetometers, barometers, hygrometers, thermometers, microphones, proximity sensors and/or ambient light sensors among others. As used herein, an internal sensor refers to a sensor implemented using the MEMS techniques described above for integration with MPU 102 into a single chip or single package.

Host processor 104 may be configured to perform the various computations and operations involved with the general function of device 100. Host processor 104, host memory 106 and MPU 102 may be coupled through bus 110, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent. As noted below, additional signaling mechanisms may be used in conjunction with bus 110, such as a dedicated interrupt line and the like. Host memory 106 may include programs, drivers or other data that utilize information provided by MPU 102. Exemplary details regarding suitable configurations of host processor 104 and MPU 102 may be found in co-pending, commonly owned U.S. patent application Ser. No. 11/774, 488, filed Jul. 6, 1007, and Ser. No. 12/106,921, filed Apr. 11, 1008, which are hereby incorporated by reference in their entirety. Suitable implementations for MPU 106 in device 100 are available from InvenSense, Inc. of Sunnyvale, Calif.

In the depicted embodiment, MPU 102 is shown to include sensor processor 112, memory 114 and sensor 108. Memory 114 may store algorithms, routines or other instructions as well as storing data output by sensor 108. For example, memory 114 may include a first in, first out (FIFO) buffer for storing a sequence of data samples generated by sensor 108. As shown, MPU 102 may include bus 116, similar to bus 110, for coupling sensor processor 112, memory 114 and sensor 108. Depending on the design of device 100, memory 114 may store at least one data sample at a time, which is periodically retrieved. In one aspect, MPU 102 may signal host processor 104 that one or more data samples are available for retrieval by sending an interrupt. In such implementations, the frequency at which an interrupt is sent may depend on the sample rate. For example, an interrupt may be sent after generation of each data sample or may be sent after generation of a predetermined number of data samples. Thus, memory 114 may also store a plurality of data samples to be retried as a batch operation by host processor 104. Although the embodiments herein are primarily discussed in the context of sensor 108 of MPU 102, the techniques may also be extended to a sequence of data samples generated by another sensor, such as external sensor 118. External sensor 118 may be local and integrated into device 100 or may be a remote sensor integrated into another device (e.g., bracelet, watch or other wearable) and coupled using any suitable wired or wireless communication protocol. As with sensor 108, external sensor 118 may represent one or more sensors, such as accelerometers, gyroscopes, magnetometers, barometers, hygrometers, thermometers, microphones, proximity sensors and/or ambient light sensors among others.

As will be appreciated, host processor 104 and/or sensor processor 112 may be one or more microprocessors, central processing units (CPUs), or other processors which run software programs for device 100 or for other applications related to the functionality of device 100. If desired, the operations described as being performed by host processor 104 may be performed by a host processor acting in conjunction with one or more additional processing resources, such as an MCU. In one embodiment, an MCU may intermediate between MPU 102 and a host (or other) processor by retrieving and time stamping data sample according to the techniques of this disclosure before passing them along to the host processor. Further, different software application programs such as menu navigation software, games, camera function control, navigation software, and phone or a wide variety of other software and functional interfaces can be provided. In some embodiments, multiple different applications can be provided on a single device 100, and in some of those embodiments, multiple applications can run simultaneously on the device 100. In the depicted embodiment, device 100 may include time stamp controller 120 configured to determine a timing characteristic associated with retrieval of the data samples and/or to apply a correction derived from the timing characteristic to adjust one or more assigned time stamps. Time stamp controller 120 may be implemented as instructions readable by host processor 104, or by any suitable combination of hardware, software and firmware. As desired, time stamp controller 120 may also be configured to perform any or all operations associated with determining time stamps to be assigned to data samples upon retrieval.

Multiple layers of software can be provided on a processor readable medium such as electronic memory or other storage medium such as hard disk, optical disk, flash drive, etc., including memory 106 and memory 114, for use with host processor 104 and sensor processor 112. For example, an operating system layer can be provided for device 100 to control and manage system resources in real time, enable functions of application software and other layers, and interface application programs with other software and functions of device 100. In some embodiments, one or more motion algorithm layers may provide motion algorithms for lower-level processing of raw sensor data provided from internal or external sensors. Further, a sensor device driver layer may provide a software interface to the hardware sensors of device 100. Additionally, a suitable application program interface (API) may be provided to facilitate communication between host processor 104 and MPU 102, for example, to transmit desired sensor processing tasks. Some or all of these layers can be provided in host memory 106 for access by host processor 104, in memory 114 for access by sensor processor 112, or in any other suitable architecture. Other embodiments may feature any desired division of processing between MPU 102, host processor 104 and any other available processing resources as appropriate for the applications and/or hardware being employed. Exemplary embodiments of API implementations in a motion detecting device are described in co-pending U.S. patent application Ser. No. 12/106,921, incorporated by reference above.

MPU 102 includes clock 122 that generates the signal used to control the sample rate of sensor 108, as well as other operations of MPU 102. As shown, clock 122 is integrated into MPU 102 but in other embodiments, a clock source external to MPU 102 may be employed as desired. For example, the signal provided by clock 122 may be used to trigger sensor processor 112 to sample the output of sensor 108 at a desired rate. Depending upon the architecture employed, an analog sensor signal may be digitized or a digital sensor signal may be directly obtained, either of which is then stored in memory 114. In another aspect, the signal from clock 122 may be used to control the sending of an interrupt to host processor 104 when one or more data samples are stored in memory 114, resulting in periodic retrieval of any currently available data samples from memory 114. As will be appreciated, the interrupt may be sent over bus 110 or over a dedicated interrupt line. Further, device 100 also includes at least one additional clock source that is independent of clock 122, such as clock 124. In the embodiment shown, clock 124 controls the operation of host processor 104 although another system clock source may be employed as desired. Clock 124 may be integrated into host processor 104 or may be from any suitable external source.

As noted above, clock 122 of MPU 102 may be implemented using a technique that generates a signal that is relatively less accurate than the signal generated by clock 124. For example, clock 122 may employ an RC timing circuit and in gyroscope applications, a vibration signal of the gyroscope may be used to stabilize the RC timing circuit. Thus, in some embodiments, the signal of clock 122 may have a frequency that is not constant and may vary over time. Clock 122 is used to control the output data rate (ODR) (i.e., sampling rate), to generate a sequence of data samples, wherein each data sample $d_i$ is taken at time $t_i$. Due to the noted errors of clock 122, the time interval between successive data samples may not be constant such that $t_i - t_{i-1} \neq t_{i+1} - t_i$. Accordingly, as described above, integrating the data samples by simply using the period associated with the ODR does not account for these variations and degrades the accuracy of the information determined from the integration.

In addition to inaccuracies associated with clock 122, there may be an unknown and varying delay between the sending of an interrupt by MPU 102 and retrieval of the one or more available data samples by host processor 104. Correspondingly, this varying delay reduces the accuracy of a time stamp assigned to a given data sample, since the time stamp is not assigned until host processor 104 retrieves the data sample. For example, the time it takes host processor 104 to respond to each interrupt may vary depending on processor load. As another example, host processor 104 may be configured to function in one or more power saving modes. Particularly in mobile applications where battery resources may be limited, it may be desirable to aggressively transition host processor 104 to a power saving mode at available opportunities. In such embodiments, the interrupt may be used to wake host processor 104 and thus the delay of host processor 104 in responding to an interrupt may vary depending on whether and what degree of power saving is employed. Other factors may also result in variations in the amount of time taken by host processor 104 to retrieve a data sample after receiving an interrupt. Thus, the period at which host processor 104 actually retrieves available data samples from memory 114 may be inconsistent. The error corresponding to the variable delay associated with the response of the host processor to an interrupt may exist regardless of the relative accuracies of clock 122 and clock 124. Accordingly, the techniques of this disclosure used to characterize the variable host processor response delay may also be applied to embodiments in which the sensor clock is at least as accurate as the host processor clock.

As noted, once host processor 104 receives an interrupt from MPU 102, it then retrieves any available data samples from memory 114. A time stamp derived from clock 124 may be applied to at least one of the data sample retrieved in response to a given interrupt. Depending on configuration, host processor 104 may determine the time stamp to be assigned to a data sample upon receipt of the interrupt and either before or after retrieving the at least one data sample. Regardless of the order of operation, the time stamp derived from clock 124 may not account for any varying delay that exists between the sending of an interrupt by MPU 102 and the corresponding response by host processor 104. Accordingly, the techniques of this disclosure include adjusting the assigned time stamp derived from clock 124 with a correction determined from a timing characteristic associated with retrieval of the data samples.

Figure 2:
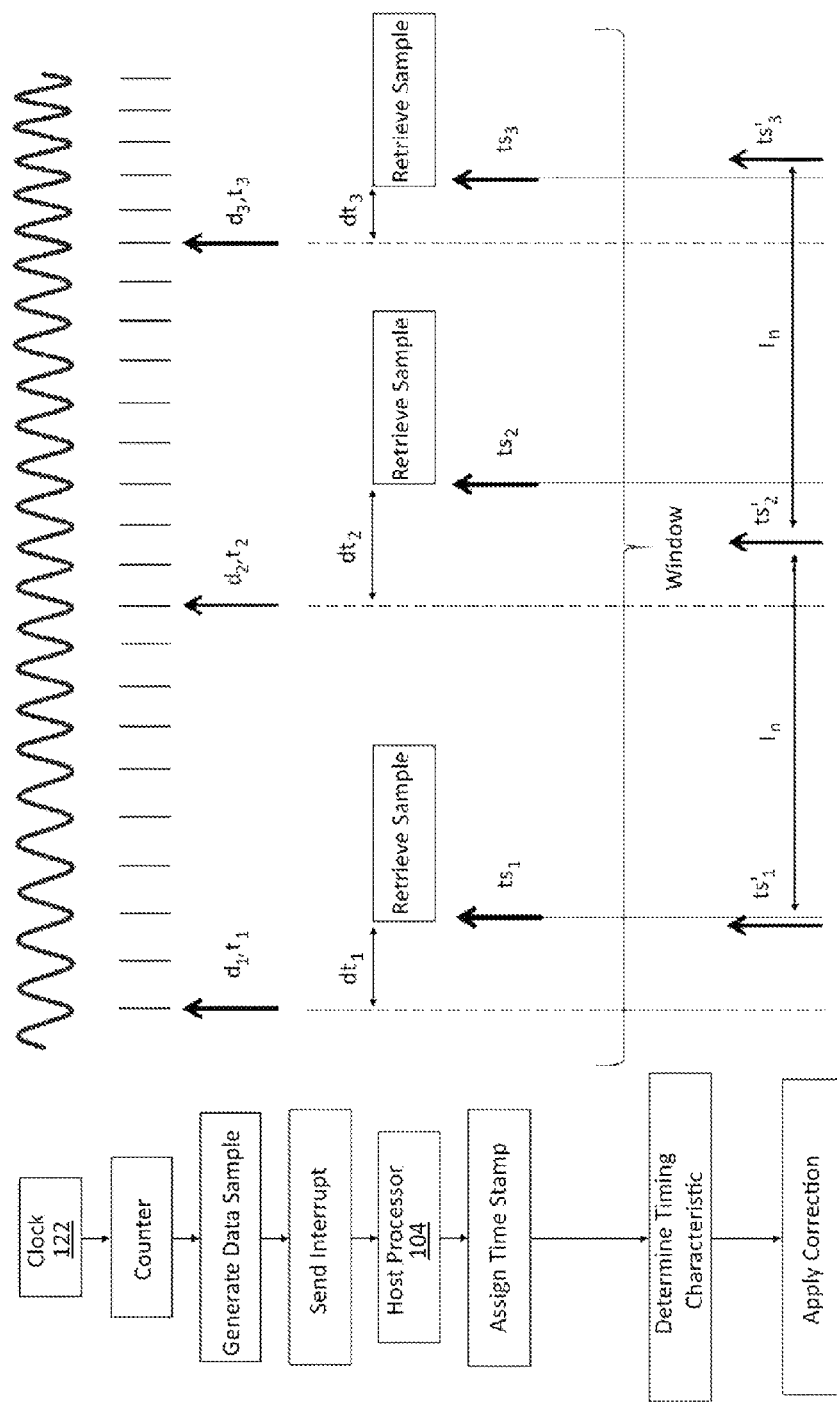
FIG. 2 is a schematic diagram illustrating steps associated with correcting an assigned time stamp according to an embodiment.

Aspects of this correction are illustrated in a simplified form for clarity in the schematic sequence diagram of FIG. 2. As shown, a clock signal is generated by clock 122 to control MPU 102. For example, a counter or other equivalent circuit may be employed to trigger the sampling of data from sensor 108 after a desired number of clock cycles and generate samples $d_i$ taken at times $t_i$, such as $d_1$ at $t_1$, $d_2$ at $t_2$ and $d_3$ at $t_3$, and store each data sample $d_i$ in memory 114. In coordination with the sampling, MPU 102 sends an interrupt to host processor 104 to signal availability of a sample for retrieval from memory 114. In this embodiment, MPU 102 is shown as sending an interrupt for each data sample. However, MPU 102 may generate a plurality of data samples, such as a predetermined number, before sending each interrupt instead. Host processor 104 may then respond to each interrupt after a delay $dt_i$ to retrieve the data samples ($dt_1$, $dt_2$ and $dt_3$ as shown). A time stamp $ts_i$ ($ts_1$, $ts_2$ and $ts_3$ as shown) derived from clock 124 may be assigned to each sample $d_i$. The delay $dt_i$ may vary for any of the reasons described above, resulting in inconsistent intervals between each $ts_i$. Accordingly, time stamp controller 120 may determine a timing characteristic associated with the retrieval of data samples. Time stamp controller 120 may also adjust at least one assigned time stamp $ts_i$ to provide a corrected $ts'_i$. As shown for this example, a correction is applied to each of $ts_1$, $ts_2$ and $ts_3$ to provide $ts'_1$, $ts'_2$ and $ts'_3$. In one aspect, this may result in a consistent interval $I_n$ between the corrected time stamps.

Time stamp controller 120 may determine the timing characteristic used to correct assigned time stamps in any suitable manner. In one aspect, the timing characteristic may be based, at least in part, on retrieval of the data samples from MPU 102. For example, time stamp controller 120 may determine the timing characteristic based on retrieval of previous data samples and their associated time stamps. This may include filtering time stamps of previous data samples. In one embodiment, a time interval between two previously retrieved data samples may be determined. Further, time stamp controller 120 may determine an average of a plurality of time intervals between previously retrieved data samples. In another example, a low pass filter may be applied to the time intervals.

Thus, in an embodiment, time stamp controller 120 may process assigned time stamps from previously retrieved data samples to determine an average time between time stamps. The assigned time stamp of at least one subsequent data sample may then be adjusted so that the interval between the at least one subsequent data sample and the immediately preceding or following data sample matches the determined average. As will be appreciated, the time stamp associated with the immediately preceding data sample may either be an assigned time stamp $ts_i$ or a corrected $ts'_i$ that may have been determined with respect to the time stamp of an earlier retrieved data sample.

In one aspect, the average time between time stamps may be determined by summing the intervals over a predetermined time window (e.g. 2 seconds, although this may be selected based on any desired criteria, such as sample rate, expected operation of host processor 104, or the like) and dividing by the number of sample intervals. In another aspect, the average time between time stamps may be averaged over a predetermined number of time stamps. Still further, the average may be determined from the time difference between a first and last sample of a window divided by the number of sample intervals. Generally, the current active average under calculation in window n may be referred to as average $A_n$, such that a previously determined average $A_{n-1}$ from window n−1 may be used to correct the assigned time stamps of incoming data samples while $A_n$ is being determined. Applying a correction to the time stamps may include adding the average $A_{n-1}$ determined from previously retrieved data samples, such as over window n−1, to provide corrected time stamp $ts'_{i,n}$ of current window n as indicated by Equation (1):

$$ts_{i,n}'=ts_{i-1,n}'+A_{n-1} \qquad (1)$$

Figure 3:
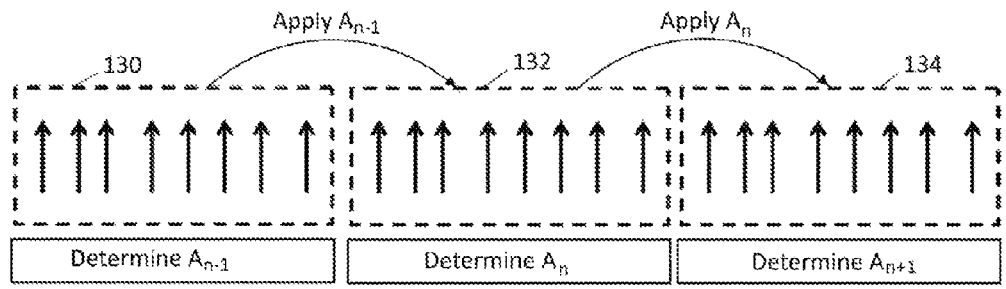
FIG. 3 is a schematic diagram showing determination of a timing characteristic using a fixed window according to an embodiment.
Figure 4:
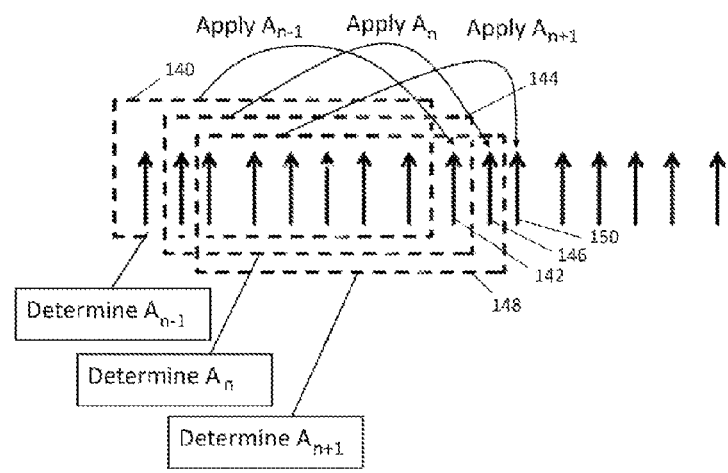
FIG. 4 is a schematic diagram showing determination of a timing characteristic using a moving window according to an embodiment.

For example, FIG. 3 schematically depicts an embodiment employing fixed windows to determine the average interval. As shown, an average $A_{n-1}$ may be determined over window 130 and applied as correction to the time stamps of samples retrieved in window 132. Likewise, average $A_n$ may be determined over window 132 and applied as correction to the time stamps of samples retrieved in window 134. Alternatively, FIG. 4 schematically depicts an embodiment employing a moving or sliding window. Average $A_{n-1}$ may be determined over window 140 and applied as correction to time stamp 142, average $A_n$ may be determined over window 144 and applied as correction to time stamp 146 and average $A_{n+1}$ may be determined over window 148 and applied as correction to time stamp 150. Although this embodiment depicts the determined average time interval being applied to the time stamp immediately succeeding the window, the spacing between the window used to determine the average time interval and the time stamp to which it is applied may be any suitable number of time stamps, such as to provide sufficient time to determine the average.

Depending on the strategy chosen, the time between corrected time stamps $ts'_i$ may be substantially constant within the window of the averaging, and may change slightly between the applications of the average from different windows. Further, when commencing operation, an initial time stamp or a plurality of initial time stamps may not be corrected until a sufficient window has elapsed to allow determination of a first average time interval. As a result, the adjusted time stamps may be built from an initial time stamp $ts_0$ having an unknown delay corresponding to the time between reception of the interrupt by host processor 104 and retrieval of the first data sample. In such embodiments, each subsequent corrected time stamp $ts'_i$ may not represent the actual time of the data sample, but since the interval between the data samples may be more accurate, integration operations involving the data samples having the corrected time stamps will correspondingly be more accurate. If desired, the window used to determine the timing characteristic may be relatively shorter when operation is started and then increased after a suitable number of data samples are generated. In a further aspect, a correction other than or in addition to an average time interval may be applied. Such other correction may be applied to initial or subsequent time stamps as warranted. For example, a default correction may be determined by calibration, testing or any other suitable means. Alternatively, when operation of device 100 has been interrupted, any previously determined average time interval may be used for the correction after retrieval from memory. Further, a correction may also be configured to compensate for known processing and/or communication delays that may be determined from the architecture of device 100.

Adjusting a time stamp by adding a determined average time interval to a previous time stamp may result in a corrected time stamp $ts'_i$ having a larger value than the assigned time stamp $ts_i$ as exemplified by timestamp $ts_3$ and corrected time stamp $ts'_3$ shown in FIG. 2. In effect, the time stamp of a given data sample may be pushed into the future by the correction. In some situations, this may represent a disallowed operation or may otherwise lead to errors. Accordingly, the corrected time stamp may be set equal to the assigned time stamp as indicated by Equation (2):

$$ts_{i,n}'=ts_{i,n} \text{ if}(ts_{i-1,n}'+A_{n-1})>ts_{i,n} \qquad (2)$$

Equation (2) may also be adjusted to by using a threshold to limit how far into the future a corrected time stamp may be advanced.

Although the time interval between time stamps may vary when the correction is not applied, it will be appreciated that the corrected time stamps tend to converge towards the smallest host processor delay $dt_i$ when an assigned, uncorrected time stamp is taken as the new reference to which the average timestamp interval is added. This convergence results because a non-correction tends to be applied for small delays which are afterwards used as a reference for the next addition of the average timestamp difference $A_{n-1}$. Subsequent conditions that result in a corrected time stamp in the future represent a smaller delay $dt_i$ so that correction converges towards the smallest delay.

In another aspect, a plurality of data samples may be available in memory 114 for retrieval. For example, if high data sampling rates in conjunction with transitions from power saving mode or processor load sufficiently delays host processor 104, one or more new data samples may be generated before the periodic retrieval of the first stored sample. Alternatively, device 100 may be configured so that MPU 102 generates a plurality of data samples before sending an interrupt to extend periods of time during which host processor 104 may be in a power saving mode. In such situations, host processor 104 may retrieve all the currently stored data samples and then perform a batch operation for the correction of the time stamps. As a result, individual time stamps may not be assigned to each stored data sample since they were all retrieved at the same time. Further, it will be appreciated that a corrected time stamp $ts'_i$ may still be determined for each stored data sample by adding the appropriate average timestamp difference $A_{n-1}$ to the previous corrected time stamp $ts'_{i-1}$ (while maintaining the correct order of the data samples). If assigned time stamps are not available for data samples within a window used for determining the average time interval, corrected time stamps may be used. Alternatively, a different window may be chosen to limit or avoid the use of corrected time stamps when determining the timing characteristic for correcting the time stamps of subsequent data samples. Further, it may be desirable to adjust the window over which the average time interval is determined. For example, if the end of the time window falls within the time corresponding to the stored data samples, the time window may be extended to include the retrieval of all of the stored data samples.

As described above, two main contributions to the errors associated with time stamps assigned to a sequence of data samples include errors of sensor clock 122 and the unknown and varying time required by host processor 104 to respond to each interrupt. For example, the frequency of clock 122 may not exactly match the desired frequency and/or may drift. Of the two, errors due to delays in host processor response may be considered more random. By determining average time intervals or otherwise filtering the assigned time stamps, the randomly varying errors of host processor response may be reduced to a constant error. In turn, this may be used to characterize errors of sensor clock 120.

As one example, MPU 102 may be programmed to obtain data samples for a certain time interval $\Delta T_{MPU}$ and periodically signal host processor 104 to retrieve the plurality of samples from a memory. To illustrate, MPU 102 may generate data samples for 1 second at a data rate of 100 Hz, and store the samples in the memory 114. After each second, MPU 102 sends an interrupt to host processor 104 to retrieve and process the data samples (in this example 100 data samples). When host processor 104 retrieves the data, at least one time stamp may be assigned. If it were assumed that clock 122 is accurate, the period of the interrupts will equal one second as programmed in the MPU. Due to the delays imparted by the varying host processor response, the time difference between the assigned time stamps might not equal one second and might vary. However, the average of the timestamp difference $\langle \Delta T_{TS} \rangle$ will approach one second as variations in host processor delay are averaged out and become constant. Therefore, the average timestamp difference $\langle \Delta T_{TS} \rangle$ should equal the time interval $\Delta T_{MPU}$ set at MPU 102 if no error exists in clock 122.

Correspondingly, any error in the sensor clock frequency will lead to a difference between $\Delta T_{MPU}$ and $\langle \Delta T_{TS} \rangle$, because the MPU 102 determines the time interval based on counting clock cycles and an assumed cycle time. To illustrate, if the sensor clock frequency is 10% higher than expected, the time between data samples will be 10% shorter, and therefore $\langle \Delta T_{TS} \rangle$ will be 10% smaller than $\Delta T_{MPU}$. The observed difference may then be used to correct the data acquisition by introducing a scaling factor based on the observed difference. This scaling factor may be applied to the number of sensor clock cycles between data samples.

Thus, if $f_{MPU}$ is the assumed frequency of the MPU, and n is the amount of clock cycles between data samples, than the time interval between data samples Ata can be defined as Equation (3):

$$\Delta t_d = n \cdot \frac{1}{f_{MPU}} \quad (3)$$

The number n may be set depending on the clock frequency and the requested output data rate (ODR) which determines $\Delta t_a$. By letting N be the desired number of data samples in the time interval $\Delta T_{MPU}$, Equation (4) may be derived:

$$\Delta T_{MPU} = N \cdot \Delta t_d = N \cdot \frac{n}{f_{MPU}} \quad (4)$$

The number N may be set to obtain the desired interval $\Delta T_{MPU}$ based on the assumed frequency $f_{MPU}$. Similarly, Equation (5) may be derived for the measured average time stamp interval $\langle \Delta T_{TS} \rangle$, wherein $f'_{MPU}$ represents the actual frequency that the clock 122 runs at:

$$\langle \Delta T_{TS} \rangle = N \cdot \frac{n}{f'_{MPU}} \quad (5)$$

Further, a scale factor s may be used to express the relationship between the assumed frequency $f_{MPU}$ and the actual frequency $f'_{MPU}$ according to Equation (6):

$$f_{MPU}' = s \cdot f_{MPU} \quad (6)$$

By combining Equations (4), (5) and (6), the scale factor s may be represented as Equation (7):

$$s = \frac{\Delta T_{MPU}}{\langle \Delta T_{TS} \rangle} \quad (7)$$

Therefore, the scale factor s may be calculated as the ratio of the desired time interval and the measured time stamp average. In turn, the scale factor s can be applied to the number n to correct for the frequency error of clock 122 and introducing a corrected n' according to Equation (8):

$$n' = s \cdot n \quad (8)$$

The corrected n' may now be used in Equation (4) to replace n and correct for the frequency error according to Equation (9):

$$\Delta T_{MPU} = N \cdot \frac{n'}{f_{MPU}} = N \cdot \frac{s \cdot n}{f_{MPU}} \quad (9)$$

From the above, it will be appreciated that by continuously comparing the average time stamp interval with the desired interval, and using the scale factor s, errors of sensor clock 122 may be corrected. This technique also works if the frequency of the sensor clock drifts or changes slowly, as long as the time over which the frequency changes is larger than the time it takes to average out error corresponding to delays in host processor response.

Figure 5:
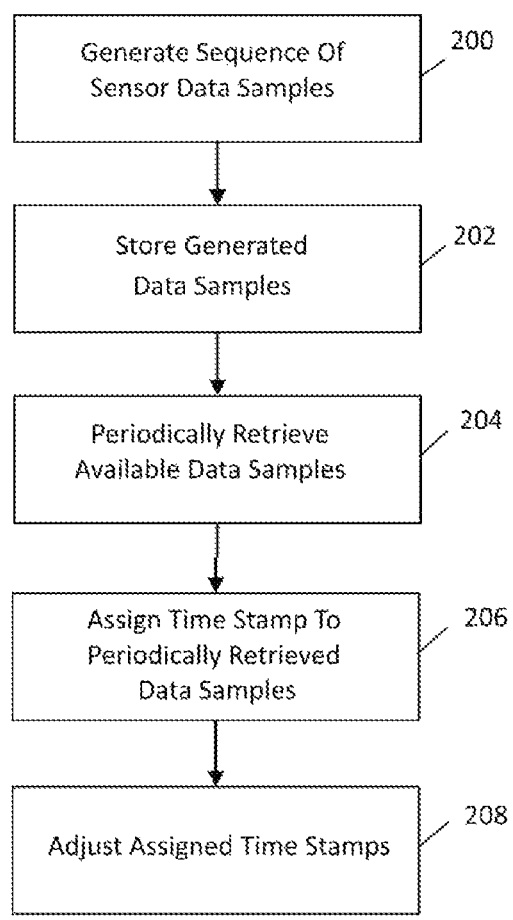
FIG. 5 is a flowchart showing a routine for time stamping a sequence data samples according to an embodiment.

To help illustrate aspects of this disclosure, an exemplary routine for providing sensor data to a host processor is represented by the flowchart shown in FIG. 5. Beginning with 200, a sequence of data samples may be generated by a sensor, such as sensor 108. The data samples may be generated at a sample rate established by a first clock source associated with the sensor, such as clock 122. Next, in 202, each sample may be stored as it is generated, such as in memory 114. At least one sample is periodically retrieved by host processor 104 in 204, for example in response to an interrupt sent by MPU 102. In 206, a time stamp is assigned to the at least one sample that is periodically retrieved. The time stamp assigned to the at least one sample may be derived from a second clock source, such as clock 124. In one aspect, the second clock source may generate a more accurate signal than the first clock source. Then, in 208, at least one assigned time stamp may be adjusted, such as by time stamp controller 120, by applying a correction determined from a timing characteristic associated with retrieval of data samples from the sensor. As discussed above, in an embodiment time stamp controller 120 may determine the timing characteristic based at least in part on previously retrieved data samples, such as by determining an average of a plurality of time intervals between previously retrieved data samples.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for providing sensor data to a host processor comprising:
   generating a sequence of data samples with a sensor at a sample rate established by a first clock source associated with the sensor;
   storing each of the data samples;
   periodically retrieving at least one data sample and any available additional data samples using the host processor;
   assigning a time stamp derived from a second clock source to each of the at least one periodically retrieved data samples using the host processor, wherein the second clock source is independent of the first clock source; and
   adjusting at least one assigned time stamp by applying a correction determined from a timing characteristic associated with retrieval of data samples from the sensor to provide a corrected time stamp unless the adjustment would result in a corrected time stamp having a value in the future compared to the assigned timestamp.

2. The method of claim 1, wherein the timing characteristic is based at least in part on retrieval of previous data samples.

3. The method of claim 2, wherein the timing characteristic is based at least in part on filtering time stamps of previous data samples.

4. The method of claim 3, wherein the timing characteristic is a time interval between two previously retrieved data samples.

5. The method of claim 3, wherein the timing characteristic is an average of a plurality of time intervals between previously retrieved data samples.

6. The method of claim 5, wherein the average of the plurality of time intervals is taken over a fixed window of the sequence of data samples.

7. The method of claim 6, wherein the correction is determined from a previous window and is applied to at least one data sample of a current window.

8. The method of claim 5, wherein the average of the plurality of time intervals is taken over a moving window of the sequence of data samples.

9. The method of claim 5, further comprising characterizing an error of the first clock source using the average.

10. The method of claim 9, further comprising compensating for the error of the first clock source.

11. The method of claim 10, wherein compensating for the error of the first clock source comprises adjusting when an interrupt is sent to the host processor.

12. The method of claim 5, wherein the corrected time stamp is derived by adding the average to a time stamp of a preceding data sample.

13. The method of claim 12, wherein the time stamp of a preceding data sample is one of an assigned time stamp and a previously corrected time stamp.

14. The method of claim 2, further comprising applying a default correction to a time stamp of at least one initial data sample.

15. The method of claim 1, wherein the corrected time stamp is derived by adding a time interval to a time stamp of a preceding data sample.

16. The method of claim 1, wherein a plurality of data samples of the sequence of data samples are stored before each periodic retrieval and wherein adjusting at least one assigned time stamp comprises applying the correction value to an adjusted time stamp of an immediately preceding data sample.

17. The method of claim 1, further comprising sending an interrupt to the host processor when at least one data sample is available for retrieval by the host processor.

18. The method of claim 17, wherein a variable delay occurs between receipt of the interrupt by the host processor and the retrieval of at least one data sample, further comprising characterizing the delay between receipt of interrupts by the host processor and retrieval of data samples.

19. The method of claim 18, wherein characterizing the delay comprises determining an average delay.

20. The method of claim 1, further comprising integrating a plurality of data samples of the sequence of data samples using the corrected time stamp.

21. A sensor device comprising:
   a sensor generating a sequence of data samples;
   a first clock source associated with the sensor, wherein the sequence of data samples are generated at a sample rate established by the first clock source;
   a memory to store data samples as they are generated;
   a host processor configured to periodically retrieve at least one data sample and any available additional data samples from the memory;
   a second clock source independent of the first clock source, wherein the host processor is further configured to assign a time stamp derived from the second clock source to each of the at least one periodically retrieved data samples; and
   a time stamp controller configured to determine a timing characteristic associated with retrieval of data samples from the sensor and adjust at least one assigned time stamp by applying a correction determined from the timing characteristic unless the adjustment would result in a corrected time stamp having a value in the future compared to the assigned timestamp.

22. The sensor device of claim 21, wherein the time stamp controller is configured to determine the timing characteristic based at least in part on an average of a plurality of time intervals between previously received data samples.

23. The sensor device of claim 21, wherein the sensor is implemented as a Micro Electro Mechanical System (MEMS).

24. The sensor device of claim 21, wherein the sensor comprises at least one of a gyroscope, an accelerometer and a barometer.

25. The sensor device of claim 21, wherein the second clock source controls operation of the host processor.

26. The sensor device of claim 21, wherein the first clock source provides a signal that is not as accurate as a signal provided by the second clock source.

27. The sensor device of claim 21, wherein the host processor is configured to receive an interrupt signaling availability of sensor data.

28. The sensor device of claim 27, further comprising a dedicated line for receiving the interrupt.

29. The sensor device of claim 27, wherein the host processor is configured to awaken from a power saving mode upon receipt of the interrupt.

30. The sensor device of claim 27, wherein the host processor is configured to determine the time stamp to be assigned to the at least one data sample upon receipt of the interrupt and after retrieving the at least one data sample.

31. The sensor device of claim 21, wherein the host processor comprises an intermediate processor and at least one additional processor, wherein the intermediate processor is configured to retrieve and assign time stamps to data samples before passing the data samples to the additional processor.

32. The sensor device of claim 21, wherein the host processor is further configured to integrate a plurality of data samples of the sequence of data samples using at least one adjusted time stamp.

33. The sensor device of claim 21, wherein the first clock source is integrated with the sensor.

34. A method for providing sensor data to a host processor comprising:
   generating a sequence of data samples with a sensor at a sample rate established by a first clock source associated with the sensor;
   storing each of the data samples;
   periodically retrieving at least one data sample and any available additional data samples using the host processor;
   assigning a time stamp derived from a second clock source to each of the at least one periodically retrieved data samples using the host processor, wherein the second clock source is independent of the first clock source; and
   adjusting at least one assigned time stamp by applying a correction determined from a timing characteristic associated with retrieval of data samples from the sensor to provide a corrected time stamp;
wherein the timing characteristic is an average of a plurality of time intervals between previously retrieved data samples, further comprising characterizing an error of the first clock source using the average and compensating for the error of the first clock source by scaling a number of cycles of the first clock source corresponding to a given sample rate based on a ratio of a desired time interval and an average of a plurality of time intervals between previously retrieved data samples.

35. A method for providing sensor data to a host processor comprising:
   generating a sequence of data samples with a sensor at a sample rate established by a first clock source associated with the sensor;
   storing each of the data samples;
   periodically retrieving at least one data sample and any available additional data samples using the host processor;
   assigning a time stamp derived from a second clock source to each of the at least one periodically retrieved data samples using the host processor, wherein the second clock source is independent of the first clock source; and
   adjusting at least one assigned time stamp by applying a correction determined from a timing characteristic associated with retrieval of data samples from the sensor to provide a corrected time stamp, wherein the timing characteristic is based at least in part on a delay between receipt by the host processor of information indicating data samples are available and retrieval by the host processor of the data samples indicated to be available.

* * * * *